United States Patent [19]

Kitoh et al.

[11] Patent Number: 4,965,291
[45] Date of Patent: Oct. 23, 1990

[54] METHOD OF MANUFACTURING POROUS MEMBRANE AND POROUS MEMBRANE MANUFACTURED BY THE SAME METHOD

[75] Inventors: Hideaki Kitoh; Yukio Seita; Noriyuki Koyama, all of Fuji; Shinsuke Yokomachi, Fujinomiya, all of Japan

[73] Assignee: Terumo Kabushiki Kaisha, Tokyo, Japan

[21] Appl. No.: 331,342

[22] Filed: Mar. 31, 1989

[30] Foreign Application Priority Data

Apr. 1, 1988 [JP] Japan .................................. 63-80453

[51] Int. Cl.$^5$ ................................................. C08J 9/28
[52] U.S. Cl. ........................................ 521/64; 521/61; 264/41
[58] Field of Search .................................... 521/64, 61

[56] References Cited

U.S. PATENT DOCUMENTS

| | | | |
|---|---|---|---|
| 3,620,895 | 11/1971 | Bailey et al. | 521/64 |
| 3,642,668 | 2/1972 | Bailey et al. | 521/61 |
| 4,203,848 | 5/1980 | Grandine, II . | |
| 4,238,571 | 12/1980 | Mano et al. . | |
| 4,384,047 | 5/1983 | Benzinger et al. | 521/64 |
| 4,598,662 | 7/1986 | Chen | 210/500.42 |
| 4,707,265 | 11/1987 | Barnes, Jr. et al. | 210/500.22 |
| 4,806,291 | 2/1989 | Susa | 521/64 |

FOREIGN PATENT DOCUMENTS 2632185 1/1977 Fed. Rep. of Germany .
2391836 12/1978 France .

OTHER PUBLICATIONS

CRC Handbook of Chemistry and Physics, 62nd Edition, 1981-1982, p. F-304.

*Primary Examiner*—Morton Foelak
*Attorney, Agent, or Firm*—Burns, Doane, Swecker & Mathis

[57] ABSTRACT

A method of manufacturing a porous membrane by dissolving vinylidene fluoride polymer in a good solvent such as acetone and then causing solidification of the resultant solution in a non-solvent. The dissolution of the vinylidene fluoride polymer in the solvent is done in a predetermined pressure condition, namely 0.1 kg/cm$^2$, preferably in a range of 0.5 to 5.0 kg/cm$^2$.

6 Claims, No Drawings

METHOD OF MANUFACTURING POROUS MEMBRANE AND POROUS MEMBRANE MANUFACTURED BY THE SAME METHOD

BACKGROUND OF THE INVENTION

This invention relates to a method of manufacturing a porous membrane and, more particularly, to a method of manufacturing a porous membrane from a vinylidene fluoride polymer.

Vinylidene fluoride polymer is excellent in mechanical strength and also in chemical stability with acid, alkali and organic solvents, and its membrane can find extensive applications as separable membranes such as filters in the fields of medical treatment. Such filters are effective for filtering bacteria and other small particles introduced into an infusion solution in a solution administration line.

To this end, a porous membrane with a uniform pore diameter is sought. Throughout the specification, by the term "vinylidene fluoride polymer" are meant vinylidene fluoride in situ, copolymers of vinylidene fluoride with ethylene tetrafluoride and propylene hexafluoride and mixtures of these compounds.

The porous membrane of vinylidene fluoride polymer can be manufactured by dissolving the polymer in a good solvent and then causing solidification of the resultant solution in a non-solvent.

At this time, a porous membrane having a desired pore diameter can be obtained by appropriately selecting the good solvent and non-solvent.

By the term "non-solvent" is meant a substance which in situ hardly dissolves polymer. By the term "good solvent" is meant a substance which can dissolve polymer in a temperature range below the melting point of the polymer. The non-solvent and good solvent have affinity to each other and can be mixed with each other.

Examples of the good solvent are acetone, dimethylformamide, dimethylacetoamide, dimethylsulfoxide and methylethylketone. These solvents are very excellent in solubility.

Examples of the non-solvent are 1,1,2-trichloro-1,2,2-trifluoroethane, dichloromethane, 1,1,1-trichloroethane, trichloroethylene, methanol, and isopropylalchol.

These good solvents, however, have high affinity to polymer. Therefore, solidification of the resultant solution in the non-solvent proceeds with difficulty and, as a result, a porous membrane lacking in the uniformity of the pore diameter is produced.

To solve this problem, it is attempted to add such additives as glycerine and surface active agent to the polymer solution for uniformalizing the pore diameter as disclosed in Japanese Patent Disclosures 58-98105 and 61-38207. However, the addition of additives to the non-solvent makes the process control difficult.

According to the Japanese Patent Disclosure 54-16382, acetone is used as good solvent. Acetone does not provide sufficient dissolving power at normal temperature.

When heated, however, it provides its intrinsic good-solvent property. Acetone has low affinity to polymer, so that it is possible to obtain a porous membrane having uniform pore diameter. However, the polymer solution has low stability and undergoes gellation in a short period of time after dissolution. It is thus difficult to obtain a smooth and uniform porous membrane, thus complicating the process.

To obtain a porous membrane having uniform pore diameter distribution from vinylidene fluoride polymer, it is necessary to dissolve polymer in a solvent, which has comparatively low affinity to polymer and hence provides insufficient dissolving power at normal temperature. In order to facilitate the process of manufacturing the membrane, it is important that the resultant polymer solution is held in a stable state free from gellation for a while even when it is cooled down to room temperature after the dissolution.

SUMMARY OF THE INVENTION

The present invention has been intended in the light of the above problems, and its object is to provide a method of manufacturing a porous membrane, which permits a porous membrane with uniform pore diameter distribution to be obtained, is free from gellation even when the polymer solution is cooled down to room temperature after dissolution of the polymer, and facilitates the process of membrane manufacture.

Another object of the invention is to provide a high quality porous membrane manufactured by the same method of manufacture.

To attain the above objects of the invention, there is provided a method of manufacturing a porous membrane by dissolving a vinylidene fluoride polymer in a good solvent and then causing solidification of the resultant solution in a non-solvent, the dissolving of said vinylidene fluoride polymer in said solvent being done in a predetermined pressure condition.

The predetermined pressure condition is suitably 0.1 kg/cm$^2$ or above, preferably 0.5 to 5.0 kg/cm$^2$. By setting a pressure of 0.1 kg/cm$^2$ or above, preferably 0.5 kg/cm$^2$ or above, the solubility can be improved.

As the good solvent is used a solvent, which provides a non-solvent property, but can provide its intrinsic good-solvent property when heated to the neighborhood of or at least its boiling point, or a mixture of this solvent and a different solvent, preferably acetone heated to the neighborhood of or at least the boiling point or a mixture of acetone and a different solvent.

With the method of manufacturing a porous membrane according to the invention, dispersion of the good solvent in the non-solvent proceeds quickly because of comparatively low affinity of the good solvent and polymer to each other, so that it is possible to obtain a porous membrane having uniform pore diameter distribution. Further, since polymer is dissolved under a predetermined pressure condition, the good solvent can be heated to the neighborhood of or at least its boiling point. The polymer thus can be held in a very stable dissolved state and is free from gellation even when cooled down to room temperature after the dissolution. It is thus possible to facilitate the process of membrane manufacture and obtain a stable membrane.

Further, by adopting the above method of manufacture, a high quality porous membrane can be obtained.

Thus, a porous membrane obtained in this way according to the invention, can be used very effectively as a filter set in a solution administration system in the field of medical treatment.

DESCRIPTION OF THE PREFERRED EMBODIMENT

Now, an embodiment of the invention will be described in detail. In this embodiment, a solvent, which provides a non-solvent property at normal temperature, but can provide its intrinsic good-solvent property when heated to the neighborhood of or at least its boiling point, is used because of comparatively low affinity with respect to vinylidene fluoride polymer, and the dissolution of vinylidene fluoride polymer in the good solvent is caused under a predetermined pressure condition. The solution obtained under the pressure condition noted above is cast on a film and solidified in a non-solvent to obtain porosity.

With such a method, the dispersion of the good solvent in the non-solvent proceeds quickly because of comparatively low affinity of the good solvent and polymer to each other, so that it is possible to obtain a porous membrane with uniform pore diameter distribution.

In addition, since the polymer is dissolved under the predetermined pressure condition, the solvent can be heated to the neighborhood of or at least its boiling point. Thus, the polymer can be held in a very stable dissolved state and is free from gellation even when cooled down to room temperature after the dissolution, thus facilitating the process of membrane manufacture and permitting stable membrane manufacture.

A high quality porous membrane can be obtained on the basis of the above method.

The pressure condition is suitably 0.1 kg/cm² or above, preferably 0.5 to 5.0 kg/cm². As the good solvent is used acetone heated to the neighborhood of or at least the boiling point of acetone or a mixture of acetone and a different solvent, for example dimethylformamide (hereinafter referred to as DMF), dimethylacetoamide, dimethylsulfoxide or methylethylketone.

The inventors conducted the following experiments to confirm the effect according to the method.

While the good solvent is heated to the neighborhood of or at least its boiling point, the "neighborhood of the boiling point" is thought to be in a range down to substantially 20° C. below the boiling point in the ordinary state.

As the non-solvent may be used 1,1,2-trichloro-1,2,2-trifluoroethane, dichloromethane, 1,1,1-trichloroethane, trichloroethylene, methanol, ethanol and isopropylalcohol.

(Example 1)

A blend solution obtained by mixing vinylidene fluoride (Kynar 301F, Penn Walt Corp., U.S.A.) and vinylidene fluoride/propyrene hexafluoride copolymer (Kynar 2801 Penn Walt Corp., U.S.A.) in a weight ratio of 80 : 20 was used as vinylidene fluoride polymer, and it was added to acetone as good solvent such that its concentration was 19.0 % by weight.

The resultant solution was heated to 62.0° C. while pressurizing it to 1.0 kg/cm² as predetermined pressure and agitated to obtain a uniform polymer solution. This solution was cast on a film, which was then immersed in 1,1,2trichloro-1,2,2-trifluoroethane (CCl₂F-CClF₂) and then dried to room temperature, thus obtaining a porous membrane. The porosity of this membrane and water permeability and a factor of removal of polystyrene latex particles 0.22 μm in diameter after rendering hydrophilic with ethanol were examined for performance evaluation. The results were shown in Table 1.

The polystyrene latex particle removal factor is defined as follows.

Commercially available 0.22 μm- latex liquid (provided by Dow Chemical Corp., U.S.A., with a diameter of 0.22 μm, a 10-% solution) was diluted with distilled water to 10,000 times for use as 100-% material liquid. Further, 50-, 20-, 10, 5-, 2- and 1-% solutions were prepared as reference liquids, and also a liquid obtained by passing the 100-% material liquid was used as inspection liquid.

The permeability (or light absorbance) of the seven different reference liquids and inspection liquid at a wavelength of 660 nm was measured, and the latex concentration C of the inspection liquid was obtained from the calibration curve obtained from the permeability (or light absorbance) of the reference liquids. The value obtained using equation (100−C) is made the latex removal factor (%) of the membrane.

(Comparative Example 1)

Blend solution of vinylidene fluoride polymer and good solvent of the same composition as in Example 1 were agitated under normal pressure and at a temperature of 57° C. to obtain uniform polymer solution. Porosity was produced in the same manner as in Example 1, and the porosity, water permeability and factor of removal of polystyrene latex particles 0.22 μm in diameter were examined to evaluate performance. The results are shown in Table 1.

(Comparative Example 2)

The same polymer as in Example 1 was used as vinylidene fluoride polymer, and it was added to a blend solvent as good solvent containing DMF and acetone in a weight ratio of 10 : 90 such that its concentration was 19 % by weight, and the resultant solution was agitated at a temperature of 55.0° C. to obtain a uniform polymer solution.

Further, porosity was produced in the same manner as in Example 1, and the porosity, water permeability and factor of removal of polystyrene latex particles 0.22 μm in diameter were examined for performance evaluation. The results are shown in Table 1.

TABLE 1

|  | Porosity (%) | Water Premeability (ml/min. cm²) | Polystyrene Latex Particle Removal Factor (%) |
|---|---|---|---|
| Example 1 | 79.1 | 8.3 | 100 |
| Comparative Example 1 | 48.6 | 0.1 or below | 100 |
| Comparative Example 2 | 78.8 | 6.0 | 94 |

The solution of Comparative Example 1 underwent gellation in several minutes after the dissolution. Therefore, it was not only difficult to obtain a uniform membrane but the obtained porous membrane had very little porosities.

Further, the membrane of Comparative Example 2, although its water permeability was low compared to the case of Example 1, had 0.22 μm polystyrene latex particles without being perfectly removed, so that its pore diameter lacked uniformity.

In contrast, the solution in Example 1 was uniform and stable even after the end of the dissolution, thus permitting ready manufacture of the membrane. The obtained membrane showed high water permeability and perfect polystyrene latex particle removal character and was a porous membrane having uniform pore diameter distribution and excellent separation efficiency.

For confirming the effects of the method according to the invention, various examples were conducted in the same manner as in Example 1. These experiments will now be described as Examples 2 to 4.

(Example 2)

A mixture as in Example 1, i.e., a mixture containing vinylidene fluoride and vinylidene fluoride/propyrene hexafluoride copolymer in a weight ratio of 80 : 20, was used as vinylidene fluoride polymer, and it was added to a blend solvent as good solvent containing acetone and DMF in a weight ratio of 90 : 10 such that its concentration was 20.0 % by weight.

The resultant solution was heated and agitated under a pressure of 2.0 kg/cm$^2$ set as predetermined pressure condition to obtain uniform polymer solution.

From this solution, a porous membrane was obtained in the manner as described in Example 1. The performance of this membrane is shown in Table 2.

(Example 3)

Vinylidene fluoride as in Example 1 was used as vinylidene fluoride polymer, and it was added to a blend solution as good solvent containing acetone and DMF in a weight ratio of 50 : 50 such that its concentration was 21.0 % by weight, and the resultant solution was heated and agitated under a pressure of 3.0 kg/cm$^2$ set as predetermined pressure condition.

From this uniform polymer solution a porous membrane was obtained in the manner as described in Example 1. The performance of this membrane is shown in Table 2.

(Example 4)

A blend solution containing vinylidene fluoride as in Example 1 and vinylidene fluoride/ethylene tetrafluoride copolymer (Kynar 7201, Penn Walt Corp., U.S.A.) in a weight ratio of 80 : 20 was used as vinylidene fluoride polymer, and it was added to acetone as good solvent such that its concentration was 19.0 % by weight. A porous membrane was obtained from this solution in the manner as described in Example 1. The performance of this membrane was shown in Table 2.

TABLE 2

|  | Porosity (%) | Water Permeability (ml/min. cm2) | Polystyrene Latex Particle Removal Factor (%) |
| --- | --- | --- | --- |
| Example 2 | 79.7 | 7.6 | 100 |
| Example 3 | 71.5 | 8.6 | 100 |
| Example 4 | 77.3 | 7.8 | 100 |

In either of Example 2 to 4, the vinylidene fluoride polymer solution obtained after dissolution in the good solvent was stable for long time, and no gellation could be observed even when the solution was cooled down to room temperature. The obtained membrane was excellent in the water permeability and separation as shown in Table 2 and had uniform pore diameter. Thus, the method according to the invention can facilitate the membrane manufacture process and permits manufacture of stable and high quality membrane.

As has been described in the foregoing, in the method of manufacturing a porous membrane according to the invention the dissolution of vinylidene fluoride polymer in a solvent having low affinity to the polymer was done under a pressurized condition, so that a stable and uniform polymer solution can be obtained.

In addition, when porosity is produced in the non-solvent, the dispersion of the good solvent in the non-solvent takes place quickly because of comparatively low affinity of the good solvent and polymer to each other. Further, since the dissolution is done under a predetermined pressure condition, the polymer can be held in a very stable dissolved state and will be free from gellation even when cooled down to room temperature after dissolution, thus facilitating the process of membrane manufacture and permitting manufacture of a stable membrane.

The porous membrane according to the invention can be very effectively utilized as a filter set in a solution administration system in the field of medical treatment.

What is claimed is:

1. A method of manufacturing a porous membrane comprising:
   (a) dissolving a vinylidene fluoride polymer in a good solvent and
   (b) causing solidification of the resultant solution in a non-solvent, wherein step (a) is carried out in a predetermined pressure condition at a pressure of at least 0.1 kg/cm$^2$ above normal pressure and wherein the good solvent is a solvent which provides a non-solvent property at normal temperature but is capable of providing its intrinsic good-solvent property when heated to or above the temperature which is about 20° C. lower than the boiling point of the solvent, or a mixture of said solvent and a different solvent.

2. The method of manufacturing a porous membrane according to claim 1, wherein said predetermined pressure condition is in a range of 0.5 to 5.0 kg/cm$^2$.

3. The method of manufacturing a porous membrane according to claim 1, wherein the good solvent is acetone or a mixture of acetone and a different solvent.

4. The method of manufacturing a porous membrane according to claim 2, wherein the good solvent is acetone or a mixture of acetone and a different solvent.

5. The method of manufacturing a porous membrane according to claim 3 wherein the different solvent is dimethylformamide, dimethylacetoamide, dimethylsulfoxide or methylethylketone.

6. The method of manufacturing a porous membrane according to claim 4 wherein the different solvent is dimethylformamide, dimethylacetoamide, dimethylsulfoxide or methylethylketone.

* * * * *